United States Patent
Na

(10) Patent No.: US 10,957,309 B2
(45) Date of Patent: Mar. 23, 2021

(54) NEURAL NETWORK METHOD AND APPARATUS

(71) Applicant: SAMSUNG ELECTRONICS CO., LTD., Suwon-si (KR)

(72) Inventor: Hwidong Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 15/838,519

(22) Filed: Dec. 12, 2017

(65) Prior Publication Data

US 2019/0051292 A1   Feb. 14, 2019

(30) Foreign Application Priority Data

Aug. 14, 2017   (KR) .......................... 10-2017-0103036

(51) Int. Cl.
| | |
|---|---|
| *G10L 15/16* | (2006.01) |
| *G10L 25/30* | (2013.01) |
| *G10L 15/28* | (2013.01) |
| *G06N 3/08* | (2006.01) |
| *G06N 3/04* | (2006.01) |

(Continued)

(52) U.S. Cl.
CPC ............ *G10L 15/16* (2013.01); *G06N 3/0445* (2013.01); *G06N 3/0454* (2013.01); *G06N 3/0481* (2013.01); *G06N 3/084* (2013.01); *G06N 5/003* (2013.01); *G10L 15/28* (2013.01); *G10L 25/30* (2013.01); *G06N 3/082* (2013.01); *G10L 15/183* (2013.01); *G10L 2015/081* (2013.01)

(58) Field of Classification Search
CPC ................................ G10L 15/16; G06N 3/082
See application file for complete search history.

(56) References Cited

U.S. PATENT DOCUMENTS 5,087,826 A * 2/1992 Holler .................. G06N 3/0445
706/38
5,182,794 A * 1/1993 Gasperi .................... G06N 3/08
706/25

(Continued)

FOREIGN PATENT DOCUMENTS

EP         3245652 A1 *  11/2017  ............. G10L 15/02

OTHER PUBLICATIONS

Wang, Tao, et al., "End-to-End Text Recognition with Convolutional Neural Networks", *Proceedings of the 21st International Conference on Pattern Recognition*, Tsukuba, Japan, Nov. 11-15, 2015 (5 pages in English).

(Continued)

*Primary Examiner* — Feng-Tzer Tzeng
(74) *Attorney, Agent, or Firm* — NSIP Law

(57) ABSTRACT

A method and apparatus for training a recognition model and a recognition method and apparatus using the model are disclosed. The apparatus for training the model obtains an estimation hidden vector output from a hidden layer of the model in response to an estimation output vector output from the model at a previous time being input into the model at a current time, and trains the model such that the estimation hidden vector of the current time matches an answer hidden vector output from the hidden layer in response to an answer output vector, corresponding to the estimation output vector of the previous time, being input into the model at the current time.

20 Claims, 12 Drawing Sheets

(51) Int. Cl.
  *G06N 5/00* (2006.01)
  *G10L 15/183* (2013.01)
  *G10L 15/08* (2006.01)

(56) References Cited

U.S. PATENT DOCUMENTS

| | | | |
|---|---|---|---|
| 5,677,990 A | 10/1997 | Junqua | |
| 6,269,351 B1 * | 7/2001 | Black | G06F 16/30 |
| | | | 706/15 |
| 7,724,957 B2 | 5/2010 | Abdulkader | |
| 7,853,338 B1 * | 12/2010 | Hovakimyan | G05B 13/048 |
| | | | 700/45 |
| 8,345,978 B2 | 1/2013 | Uzelac et al. | |
| 8,842,640 B2 | 9/2014 | Jeon et al. | |
| 8,953,885 B1 | 2/2015 | Och et al. | |
| 9,263,036 B1 * | 2/2016 | Graves | G10L 15/16 |
| 9,520,128 B2 | 12/2016 | Bauer et al. | |
| 2004/0015459 A1 * | 1/2004 | Jaeger | G06N 3/08 |
| | | | 706/15 |
| 2015/0356401 A1 | 12/2015 | Vinyals et al. | |
| 2016/0086600 A1 | 3/2016 | Bauer et al. | |
| 2016/0140435 A1 | 5/2016 | Bengio et al. | |
| 2016/0180215 A1 | 6/2016 | Vinyals et al. | |
| 2018/0121419 A1 | 5/2018 | Lee et al. | |

OTHER PUBLICATIONS

Graves, Alex, et al., Speech Recognition with Deep Recurrent Neural Networks Proceedings of the IEEE International Conference on Acoustics, Speech, and Signal Processing, Mar. 22, 2013 (5 pages in English).

Vesely, Karel, et al., "Sequence-discriminative training of deep neural networks", *Interspeech*, January 2013 (5 pages in English).

Cho, Kyunghyun, et al., "On the Properties of Neural Machine Translation: Encoder-Decoder Approaches", Cornell University, Proceedings *of the Eighth Workshop on Syntax, Semantics and Structure in Statistical Translation*, Oct. 7, 2014 (9 pages in English).

Bengio, Samy, et al., "Scheduled Sampling for Sequence Prediction with Recurrent Neural Networks", *Proceedings of the 28$^{th}$ International Conference on Neural Information Processing Systems, vol. 1*, Sep. 23, 2015 (9 pages in English).

Wiseman, Sam, et al., "Sequence-to-Sequence Learning as Beam-Search Optimization", *Cornell University, Computation and Language; ,learning; Neural and Evolutionary Computing; Machine Learning, ArXiv: 1606.02960*, Jun. 9, 2016 (11 pages in English).

* cited by examiner

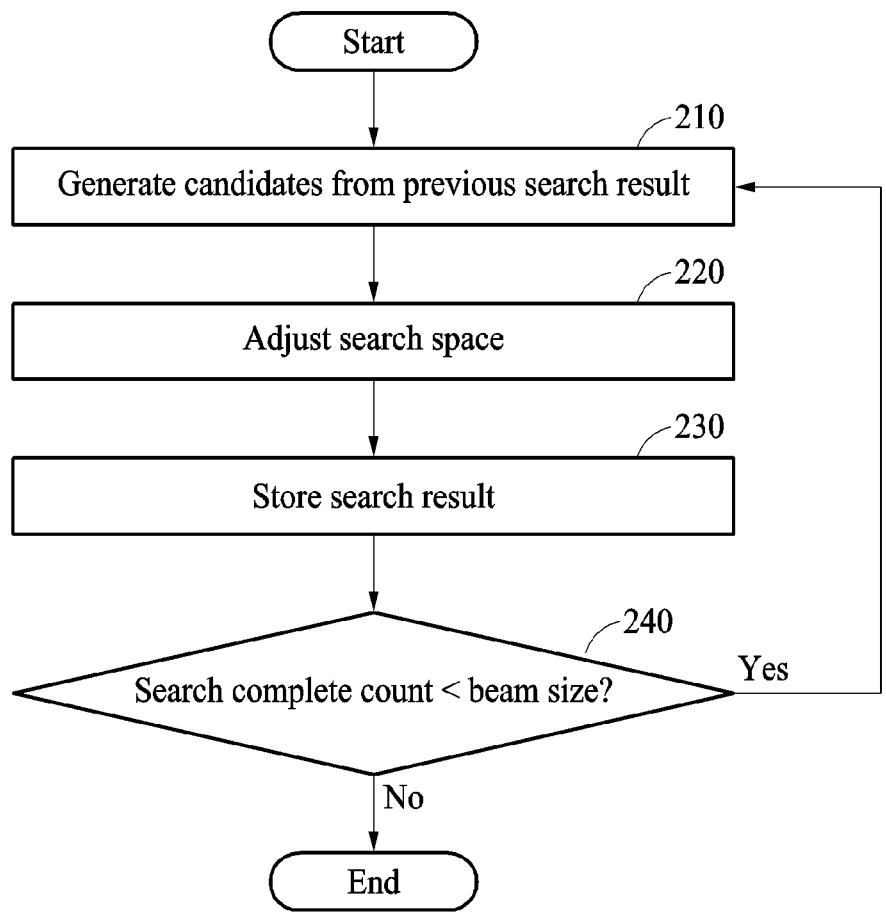

NEURAL NETWORK METHOD AND APPARATUS

CROSS-REFERENCE TO RELATED APPLICATIONS

This application claims the benefit under 35 USC § 119(a) of Korean Patent Application No. 10-2017-0103036 filed on Aug. 14, 2017 in the Korean Intellectual Property Office, the entire disclosure of which is incorporated herein by reference for all purposes.

BACKGROUND

1. Field

The following description relates to a neural network method and apparatus.

2. Description of Related Art

Recently, a technological automation of speech recognition, for example, has been implemented through processor implemented neural network models, as specialized computational architectures, that after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented method of training a model includes obtaining an estimation hidden vector for a current time as output from a hidden layer of a model in response to an estimation output vector output from the model at a previous time being input into the model at a current time, and training the model such that the estimation hidden vector for the current time matches an answer hidden vector for the current time as output from the hidden layer in response to an answer output vector, corresponding to the estimation output vector at the previous time, being input into the model for the current time.

The training may include determining a first weight based on a determined difference between an estimation hidden vector for the previous time as output from the hidden layer of the model for the previous time and an answer hidden vector for the previous time corresponding to the estimation hidden vector for the previous time, and applying the determined first weight to a determined difference between the answer hidden vector for the current time and the estimation hidden vector for the current time to generate a loss for the hidden layer that parameters of the model are adjusted toward in the training for reducing the loss.

The first weight may be determined to decrease as the difference between the estimation hidden vector for the previous time and the answer hidden vector for the previous time increases, and the first weight may be determined to increase as the difference between the estimation hidden vector for the previous time and the answer hidden vector for the previous time decreases.

An estimation hidden vector for the previous time as output from the hidden layer of the model for the previous time may match an answer hidden vector for the previous time corresponding to the estimation hidden vector for the previous time.

The training may include training the model such that the estimation hidden vector for the current time matches the answer hidden vector for the current time, and such that an estimation output vector output from the model at the current time matches an answer output vector corresponding to the estimation output vector of the current time.

The model may be a recurrent neural network (RNN) in which an estimation hidden vector for the previous time, output from the hidden layer for the previous time, is input to the hidden layer for the current time.

The model may be configured to perform an inference operation based on a beam search (BS) to perform a search for a predetermined number of most suitable candidates among candidates estimated at the previous time.

The training may further include training the model by applying a second weight to a determined difference between the estimation hidden vector for the current time and the answer hidden vector for the current time to generate a loss for the hidden layer that parameters of the model are adjusted toward in the training for reducing the loss, where the second weight is determined based on a candidate ranking of the estimation output vector at the previous time.

The second weight may be determined to increase as the candidate ranking of the estimation output vector at the previous time increases and the second weight may be determined to decrease as the candidate ranking of the estimation output vector at the previous time decreases.

In one general aspect, provided is a non-transitory computer-readable storage medium storing instructions that, when executed by a processor, cause the processor to perform any, any combination, or all operations or methods described herein.

In one general aspect, a processor implemented recognition method may include acquiring sequence data, and recognizing the sequence data by implementing a pre-trained recognition model that is trained such that an estimation hidden vector for a current time as output from a hidden layer of the model, and in response to an estimation output vector output from the model at a previous time being input into the model at the current time, matches an answer output vector corresponding to the estimation output vector output from the model at the previous time.

In one general aspect, an apparatus for training a model includes a processor configured to obtain an estimation hidden vector for a current time as output from a hidden layer of a model in response to an estimation output vector output from the model at a previous time being input into the model at a current time, and train the model such that the estimation hidden vector for the current time matches an answer hidden vector for the current time as output from the hidden layer in response to an answer output vector, corresponding to the estimation output vector at the previous time, being input into the model for the current time.

The apparatus may further include a memory storing instructions, which when executed by the processor, cause the processor to perform the obtaining of the estimation hidden vector for the current time, perform the training of the model such that the estimation hidden vector for the current time matches the answer hidden vector for the current time, and perform the storing of the trained model in the memory.

The processor may be configured to determine a first weight based on a determined difference between an estimation hidden vector for the previous time as output from the hidden layer of the model for the previous time and an answer hidden vector for the previous time corresponding to the estimation hidden vector for the previous time, and apply the determined first weight to a determined difference between the answer hidden vector for the current time and the estimation hidden vector for the current time to generate a loss for the hidden layer that parameters of the model are adjusted toward in the training for reducing the loss.

An estimation hidden vector for the previous time as output from the hidden layer of the model for the previous time may match an answer hidden vector for the previous time corresponding to the estimation hidden vector for the previous time.

The processor may be configured to train the model such that the estimation hidden vector for the current time matches the answer hidden vector for the current time, and such that an estimation output vector output from the model at the current time matches an answer output vector corresponding to the estimation output vector of the current time.

The model may be configured to perform an inference operation based on a beam search (BS) to perform a search for a predetermined number of most suitable candidates among candidates estimated at the previous time.

The processor may be further configured to train the model by applying a second weight to a determined difference between the estimation hidden vector for the current time and the answer hidden vector for the current time to generate a loss for the hidden layer that parameters of the model are adjusted toward in the training for reducing the loss, where the second weight may be determined based on a candidate ranking of the estimation output vector at the previous time.

In one general aspect, a processor implemented recognition method includes obtaining an answer hidden vector for a current time as output from a hidden layer of a recognition model in response to an answer output vector output from the model for a previous time being input into the model for the current time, obtaining an estimation hidden vector for the current time as output from the hidden layer of the model in response to an estimation output vector output from the model for the previous time being input into the model for the current time, and training the model by recursively adjusting parameters of the model in a direction toward an estimation hidden vector for a subsequent time matching an answer hidden vector for the subsequent time as output from the hidden layer for the subsequent time.

The obtaining of the answer hidden vector for the current time and the obtaining of the estimation hidden vector for the current time may be performed simultaneously.

The training may further include determining a first weight based on a determined difference between an estimation hidden vector for the previous time as output from the hidden layer of the model for the previous time and an answer hidden vector for the previous time and corresponding to the estimation hidden vector for the previous time, and applying the determined first weight to a determined difference between the answer hidden vector for the current time and the estimation hidden vector for the current time to generate a loss for the hidden layer that the recursive adjusting of the parameters of the model is directed toward reducing.

The model may be configured to perform an inference operation based on a beam search (BS) to perform a search for a predetermined number of most suitable candidates among candidates estimated at the previous time.

The training of the model may further include applying a second weight to a determined difference between the estimation hidden vector for the current time and the answer hidden vector for the current time to generate a loss for the hidden layer that parameters of the model are adjusted toward in the training for reducing the loss, where the second weight may be determined based on a candidate ranking of the estimation output vector output from the model for the previous time.

Other features and aspects will be apparent from the following detailed description, the drawings, and the claims.

BRIEF DESCRIPTION OF THE DRAWINGS

FIGS. 2 and 3 illustrate an example of a beam search (BS) implemented by an example recognition model of a recognition apparatus.

Figure 1A:
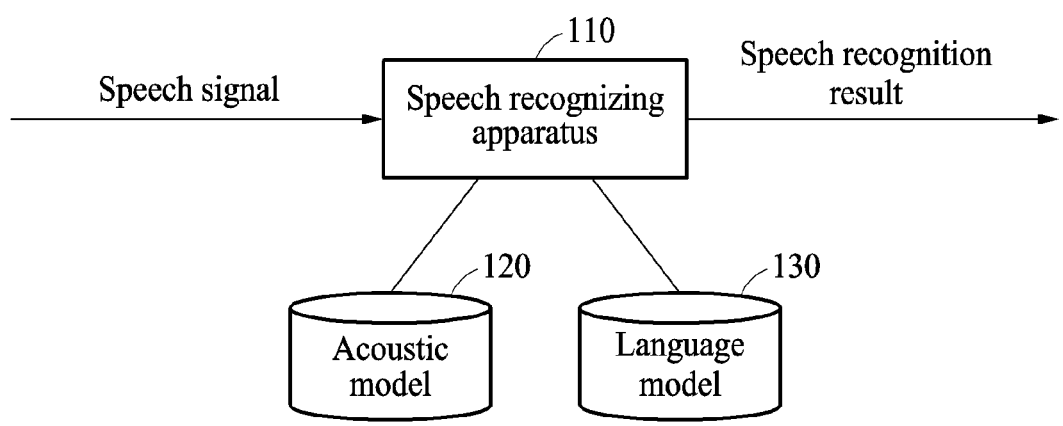
FIGS. 1A through 1C illustrate examples of a speech recognizing process and an example recognition apparatus.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. For example, as used herein, singular forms are intended to include plural forms as well, unless the context clearly indicates otherwise. As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. As further used herein, the term "and/or" includes any and all combinations of one or more of the associated listed items. Expressions such as "at least one of," when preceding a list of elements, modify the entire list of elements and do not modify the individual elements of the list.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "coupled," or "joined" to another component, a third component may be "coupled," and "joined" between the first and second components, although the first component may be directly coupled or joined to the second component. In addition, it should be noted that if it is described in the specification that one component is "directly coupled" or "directly joined" to another component, a third component may not be present therebetween. Likewise, expressions, for example, "between" and "immediately between" and "adjacent to" and "immediately adjacent to" may also be construed as described in the foregoing. The use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Examples set forth hereinafter set forth hardware configured to implement recognition operations using one or more neural networks and/or configured to train such one or more neural networks for subsequent use in such recognition. The examples may be implemented as any of various types of products such as a personal computer, a laptop computer, a tablet computer, a smart phone, a smart home appliance, an intelligent vehicle, a kiosk, and a wearable device. For example, the examples are used to recognize a voice or image of a user in the smart phone, a mobile device, or a smart home system, and/or to train a neural network to recognize a voice or image of a user in the corresponding device. Examples also include implementing the recognition to control additional functions of the corresponding device or another device.

FIG. 1A illustrates an example of a speech recognizing process of an example recognition apparatus.

A recognition apparatus 110 performs speech recognition and outputs a speech recognition result by recognizing a speech signal input to the recognition apparatus 110. The speech recognition indicates a process of converting spoken language information included in the speech signal to corresponding text information, for example. The recognition apparatus 110 analyzes the input speech signal and estimates text information indicated by language information included in the speech signal.

In an example, the recognition apparatus 110 may be embedded in, configured to interact with, or representative of devices such as, for example, a mobile phone, a cellular phone, a smartphone, a personal computer (PC) (such as a laptop, a notebook, a netbook, or a tablet PC (tablet), a personal digital assistant (PDA), a digital camera, a game console, an MP3 player, a personal multimedia player (PMP), an e-book, a global positioning system (GPS) navigation device, a set-top box, or a home appliance, or any other mobile or stationary device capable of wireless or wired network communication. The recognition apparatus 110 may also be embedded in, configured to interact with, or representative of devices such as, for example, a smart appliance, an intelligent vehicle, an autonomous vehicle, a smart building system, a smart home system, a smart office system, or a smart electronic security system. Also, the recognition apparatus 110 may be included in, configured to interact with, or representative of a wearable device worn on a body of a user, such as a ring, a watch, a pair of glasses, a bracelet, an ankle bracelet, a belt, a necklace, an earring, a helmet, or a device embedded in clothing. The recognition apparatus 110 may be included with, or configured to interact with, one or more microphones to capture the speech signal. In addition, the recognition apparatus 110 may be further included with, or configured to interact with, an analog to digital converter (ADC) and parser that may parse an example captured speech signal into digital audio frames, for example.

The recognition apparatus 110 may extract a feature from a speech signal and estimate a speech recognition result based on the extracted feature. In an example, the recognition apparatus 110 obtains or generates a spectrogram from/of the speech signal and extracts a frequency feature of the speech signal from the spectrogram. As only an example, the recognition apparatus 110 may obtain or generate such an example spectrogram by representing a result of analyzing a spectrum of the speech signal in a time-frequency domain using a Fourier transform. A method of extracting such feature(s) from the speech signal is not limited thereto and various methods may be used to extract such feature(s) from the speech signal. For example, the recognition apparatus 110 may use a feature value of a Mel-frequency cepstrum coefficient (MFCC) based on a nonlinear frequency feature of a human ear for speech recognition, as an example extracted feature. The feature value of the MFCC may be obtained by the recognition apparatus 110, for example, (1) dividing a speech signal in a speech frame unit based on a time window, (2) converting a speech frame to a frequency area using a fast Fourier transform (FFT), (3) dividing the speech frame into signals of frequency bands using a filterbank, (4) calculating an energy of each of the signals of frequency bands, and (5) applying a discrete Cosine transform (DCT) to the calculated energy, for example.

The recognition apparatus 110 may implement one or more speech recognition models including an acoustic model 120 and a language model 130, for example, to estimate the speech recognition result. In addition, as demonstrated in FIG. 10, the recognition apparatus 110 may further implement a decoder operation to translate the recognized speech into another language, and thus be configured to output a result of that translation. The acoustic model 120 may be used to recognize the speech signal in a phoneme unit, for example, based on the feature extracted from the speech signal. The recognition apparatus 110 may estimate words indicated by the speech signal based on the speech recognition result in the phoneme unit obtained by the acoustic model 120. The language model 130 may be used to obtain probability information based on a connection relationship between words. For example, the language model 130 may provide the probability information related to a subsequent word to be linked after a word input to the language model 130. For example, in response to a word "this" being input to the language model 130, the language model 130 provides the probability information related to a case in which "is" or "was" is linked after "this". In an example, the recognition apparatus 110 selects the connection relationship between words of which a probability is greatest based on the probability information by the language model 130 and outputs a result of the selecting as the speech recognition result.

The acoustic model 120 and/or the language model 130 may be implemented through one or more processors configured as one or more models or neural networks or such one or more processors configurable as the one or more models or neural networks, e.g., based on trained neural network parameters stored in a memory of the recognition apparatus 110. The neural network(s) may be recognition model(s) implemented solely through hardware or a combination of one or more computing hardware and instructions, i.e., stored in one or more non-transitory computer readable media, which when executed by the one or more computing hardware cause the one or more computing hardware to configure as and implement such neural network(s). The neural network may be trained during a learning or training process using training data, such as described further below. In an example, the recognition apparatus 110 may also perform the training or obtain corresponding trained parameters from an external processing device and/ or server or from the memory of the recognition apparatus 110. In an example, a recurrent neural network (RNN), where an output value of a hidden layer corresponding to a previous time may be re-input through recurrent connection(s) to the same hidden layer corresponding to a current time, for example, may be configured to implement the acoustic model 120 and the language model 130, e.g., together or collectively, by the recognition apparatus 110 for the example speech recognizing discussed herein. In an example, re-inputting of the example output value may be with respect to re-inputting an output from a particular node of the hidden layer for the previous time back to the same node through a recurrent connection for consideration in the current time.

Such neural network recognition models discussed herein include a plurality of layers. Each of the layers includes a plurality of nodes, which may be defined and configured to perform predetermined activations of activation results from previous layers or of inputs based on the trained parameters. For example, nodes of hierarchically or laterally neighboring layers may be connected by weighted connections, as an example of the trained parameters. For example, after substantial repetitive or recursive adjustments during training a corresponding neural network, the corresponding weights of such connections are assigned. The trained parameters may thus be stored in the memory of the recognition apparatus 110, and when acquired or loaded from the memory and then implemented by a processor/processing element of the recognition apparatus 110 the neural network is thereby configured in the recognition apparatus 110 and so respective objectives of the neural network may be achieved for information provided to the neural network.

The plurality of layers of the neural network include at least an input layer, a hidden layer, and an output layer, for example. During training, the input layer may be provided training data, e.g., to train the neural network and assign the trained parameters, such as through an example supervised training approach. During implementation of the neural network based on non-training data, for example, the input layer receives an input to be used to perform recognition, such as from captured audio of a voice. Each respective input layer thus transmits the input to an example respective first hidden layer. The example output layer may generate an output of the corresponding neural network based on outputs from nodes of the example first hidden layer, such as in the example where there is a single hidden layer. Thus, the hidden layer is an intermediate layer disposed between the input layer and the output layer. Depending on the training or implementation examples, the hidden layer may thus extract features from, and/or transform the training data or recognition target data received from, the input layer to values or information that can then be used to predict or estimate the training data or recognition target data.

As noted above, the recognition neural network may be a recurrent neural network (RNN), which is a neural network structure suitable for handling data containing sequential information such as a speech, a string of text or information, video, and industrial data, for example, an output value of a sensor related to weather or time, as well as other applications in additional differing examples. As noted, the RNN is a neural network including a loop therein, and has a structure in which an output of a layer in the neural network is input again into the corresponding layer. For example, an output from a node in the RNN at a previous time is recurrently input again to the corresponding node. Thus, in the RNN, both a feature vector output in a previous layer at a current time and a feature vector output at a current layer in a previous time are considered for results of the current time.

In an example, an RNN decoder may have the RNN structure in which an output of a current time is provided as an input of a subsequent time. The example RNN decoder may be utilized as the example language model of the recognition apparatus 110 of FIG. 1A, for example, configured to predict a probability of a word following a provided current word. In an example, such an RNN decoder may also be utilized to include the example acoustic model of the recognition apparatus 110.

In another example structure of the RNN, for example and as demonstrated below in the example of FIG. 10, a translation model having an encoder-decoder structure may be implemented, where an RNN encoder 140 generates context information with respect to a provided source text, and an RNN decoder 150 progressively generates a translated sentence based on the context information. For example, as illustrated in FIG. 10 and from left to right, the translation results in the Korean language correspond to "I", "yesterday", "pizza", "ate". That is, a process of inferring a word having a highest probability of following a word of a current time by providing the word of the current time as an input of a subsequent time is iteratively performed until corresponding recognition is terminated.

In FIG. 10, the recognition apparatus 100 includes the example RNN decoder 150 and the RNN encoder 140, which in a non-limiting example may correspond to the recognition apparatus 110 of FIG. 1A. As will be referred to below with greater detail, the encoder RNN 140 may perform recognition of input speech, with an output of the encoder RNN 140 being input to the decoder RNN 150, which is trained for the translation objective. The illustrated weights $w_i$ are intended to represent the respective trained weights applied during the respective implementations of portions of an example neural network corresponding to the encoder RNN 140 and portions of the example neural network corresponding to the decoder RNN 150. Alternatively, each of the encoder RNN 140 and decoder RNN 150 may be separate neural networks, e.g., either or both of which may be trained as discussed further below with respect to FIGS. 2 through 9B. In such an example, both of the encoder RNN 140 and the decoder RNN 150 may be considered respective recognition apparatuses or devices or as being configured to implement respective recognition models.

Figure 1B:
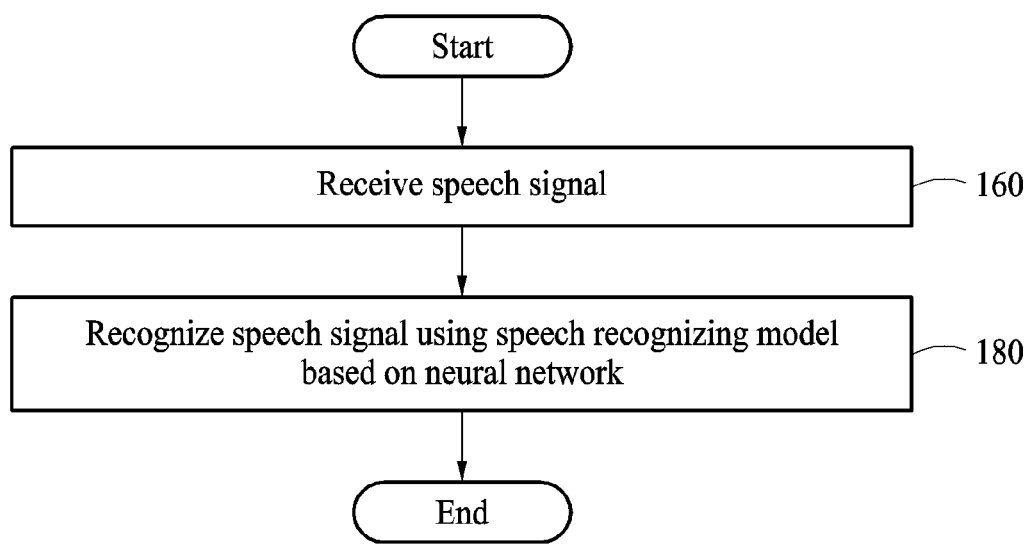
Figure 1C:
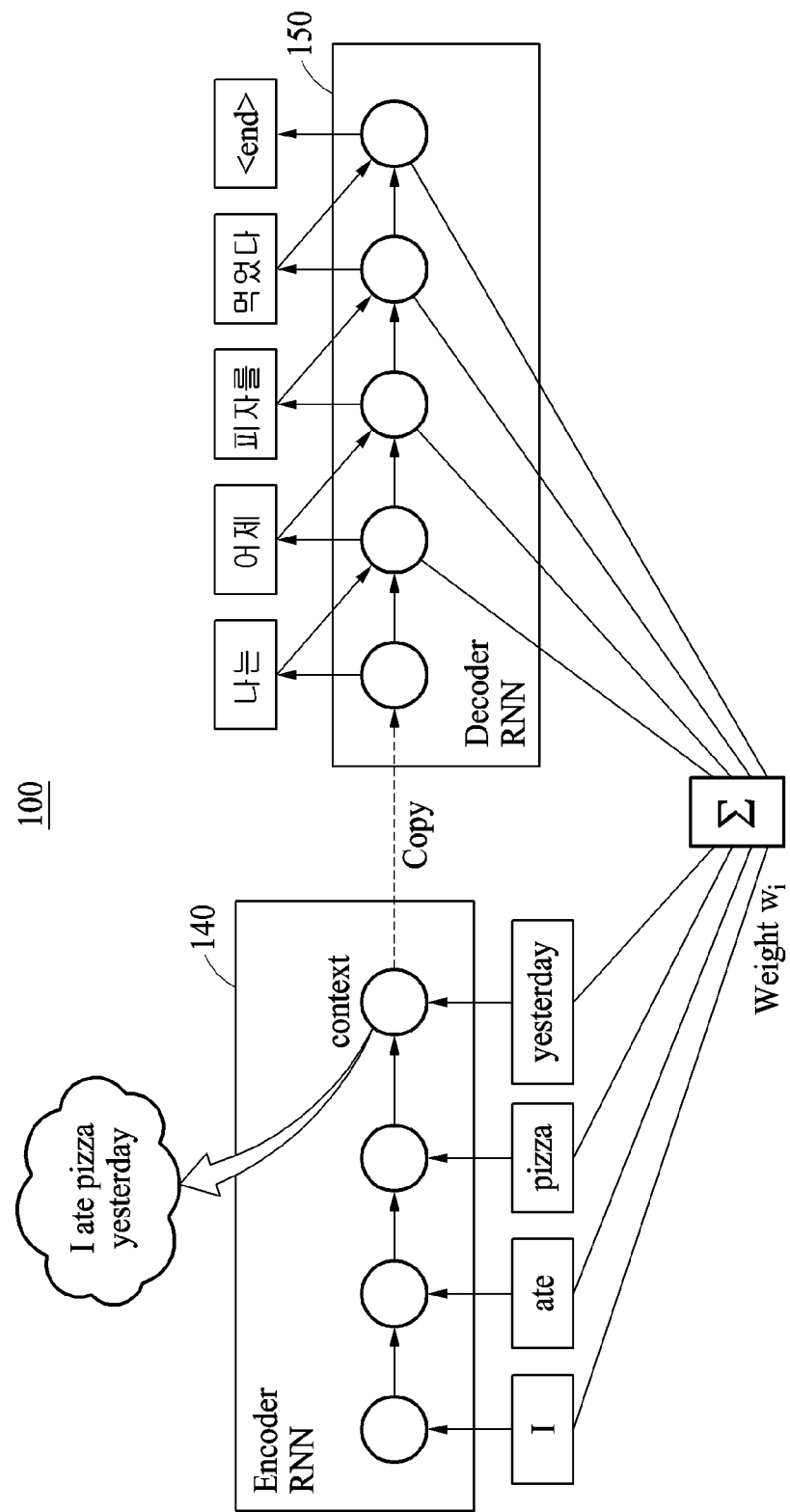

FIG. 1B is a flowchart illustrating an example of the speech recognizing method of the recognition apparatus.

The speech recognizing method may be performed by any of the recognition apparatuses discussed herein, noting that embodiments are not limited thereto. Referring to FIG. 2, in operation 160, the recognition apparatus receives or captures a speech signal. The speech signal may include, or captured to include through further processing, a plurality of speech frames including information on a speech changing as time passes. The speech frames may include, for example, a frequency feature value of a Mel-frequency cepstrum coefficient (MFCC) or a value of a bin based on a frequency component represented in a spectrogram. Thus, for example, the recognition apparatus may divide the speech signal into signals of different frequency components and extract a corresponding frequency feature value from the divided signals.

In operation 180, the recognition apparatus recognizes the speech signal using a speech recognition model implemented through one more trained neural networks. Respective speech frames may be input to the speech recognition model, or a plurality of speech frames may be simultaneously input to the speech recognition model. For example, a feature value of the signals of the example different frequency components divided from the speech signal may be input to the speech recognition model.

As explained further below, the neural network that is configured to implement the speech recognition model may be trained in advance to output the recognition result corresponding to the input information. For example, as a result of such training, structural parameters and connection weight parameters of the trained neural network may be stored, and the trained neural network reproduced, implemented, and utilized based on those stored structural parameters and connection weight parameters. Thus, the recognition result output by the speech recognition model may be obtained based on trained structural parameters and connection weight parameters of the neural network determined in the training process. Further descriptions of processes in which the recognition apparatus may recognize the speech signal using such recognition models are provided in greater detail further below.

Accordingly, depending on trained objective, example operations by which such recognition apparatuses recognize or interpret input information using a recognition model, e.g., through a configured neural network, will be discussed in greater detail below. In addition, such training operations of the various neural network examples will be also discussed in greater detail below. Briefly, with respect to FIGS. 1A through 10, though FIGS. 1A through 10 demonstrate examples where the recognition apparatuses perform speech recognition and/or speech translation, these references to example speech recognitions/translations are only example embodiments, as additional and/or alternative recognition neural networks are also available in various examples, such as for the above additional and/or alternative video, string, industrial data, etc., interpretation objectives.

Figure 3:
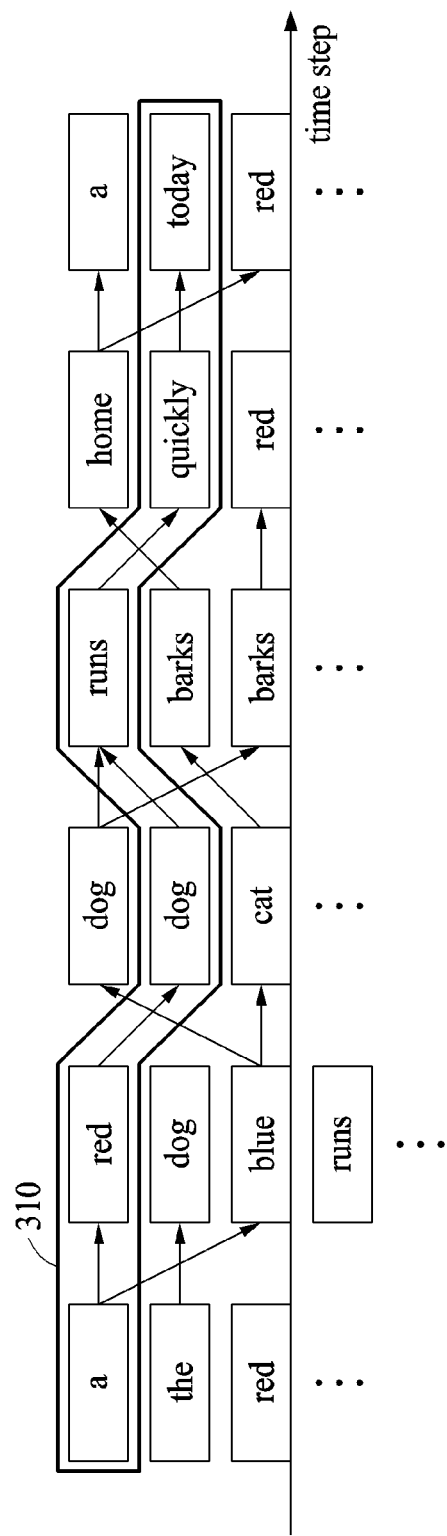

FIGS. 2 and 3 illustrate an example of a beam search (BS) implemented by an example recognition model of a recognition apparatus.

Referring to FIG. 2, an example of a process of performing a BS is illustrated.

The BS is a scheme of searching for an answer path from among all candidate paths, i.e., without searching for all candidate paths. The BS does not return a result of the search as all the candidate paths, but rather returns a result of a select number of candidate paths, e.g., dependent on the beam width of the search, and thus when the recognition model performs an inference operation, e.g., recognition operation, the recognition model may perform the inference more efficiently than if all candidate paths are considered.

In operation 210, candidates are generated based on a previous search result. Candidates having probabilities, as to their respective probabilities of being subsequent to output data of a previous time, are thus generated from the corresponding output data. In an example, the candidates may be selected or generated from a predetermined vocabulary, for example, and based on the previous search result.

In operation 220, a search space is adjusted. Candidates remaining outside the adjusted search space, i.e., except for a predetermined number of determined most suitable candidates among the candidates generated in operation 210 within the adjusted search space, are removed. That is, a predetermined number of candidates are determined from a highest such probability and in an order of decreasing such probabilities, and remaining candidates, except for the determined candidates, are excluded. Here, the predetermined number may vary depending on example. Thus, in this example, the select number of candidates with the highest probabilities are determined.

In operation 230, the search result is stored, e.g., the determined candidates (or identification of the same) not removed in operation 220 are stored in a memory of the recognition apparatus. In this example, additional information related to the candidates to be stored may also be stored, and in an example such additional information and the search result may be stored together.

In operation 240, whether a search complete count is less than a beam size is determined. For example, in response to the search result being stored in operation 230, a search with respect to the corresponding time may be considered as having been completed. Each time such a search is completed, the recognition apparatus may determine whether the search complete count of the corresponding time is less than the beam size.

In response to the search complete number being less than the beam size, operations 210 through 240 are iteratively performed until the search complete count is greater than or equal to the beam size for determining the candidates for the current time.

Referring to FIG. 3, an example of an implemented BS is illustrated.

In the example of FIG. 3, the words "red", "dog", "blue", and "runs" may be generated as candidate words having high probabilities of being subsequent to, or following, the words "a", "the", and "red" of a first time step. Thus, for the second time step results, a predetermined number of candidate words are selected from the generated candidate words in an order of their relative high probabilities of following the words of the first time step. For example, in a case in which the predetermined number is "3", "red", "dog", and "blue" are selected and "runs" is removed from further consideration.

Further, as demonstrated with the third time step, the words "dog", "dog", and "cat" may be generated as candidate words having relative high probabilities of following the words "red", "dog", and "blue" of the second time step. Similarly, a predetermined number of candidate words may be selected from the generated candidate words for the third time step.

Through respective implementations of the BS for each time step, a final recognition result of "a red dog runs quickly today" 310 is deduced efficiently in the sixth time step, without searching from among all available candidate paths. In FIG. 3, the illustrated arrows respectively demonstrate which previous word a current time step candidate word is determined as a candidate of following from. For example, in the sixth time step, the candidate word "today" is a candidate word with a high probability of following the fifth time step candidate word "quickly", and the candidate words "a" and "red" are respective candidate words with respectively high probabilities of following the fifth time step candidate word "home." Through this process, FIG. 3 thus also demonstrates that the determined subsequent time step candidate words may not include all candidate words that could have been determined for the candidate words of the previous time step. For example, based on relative lower probabilities, a candidate word for following the second time step candidate word "dog" may not be among the remaining candidate words of the third time step, just as a candidate word for following the fifth time step candidate word "red" may not be among the remaining candidate words of the six time step.

Figure 4:
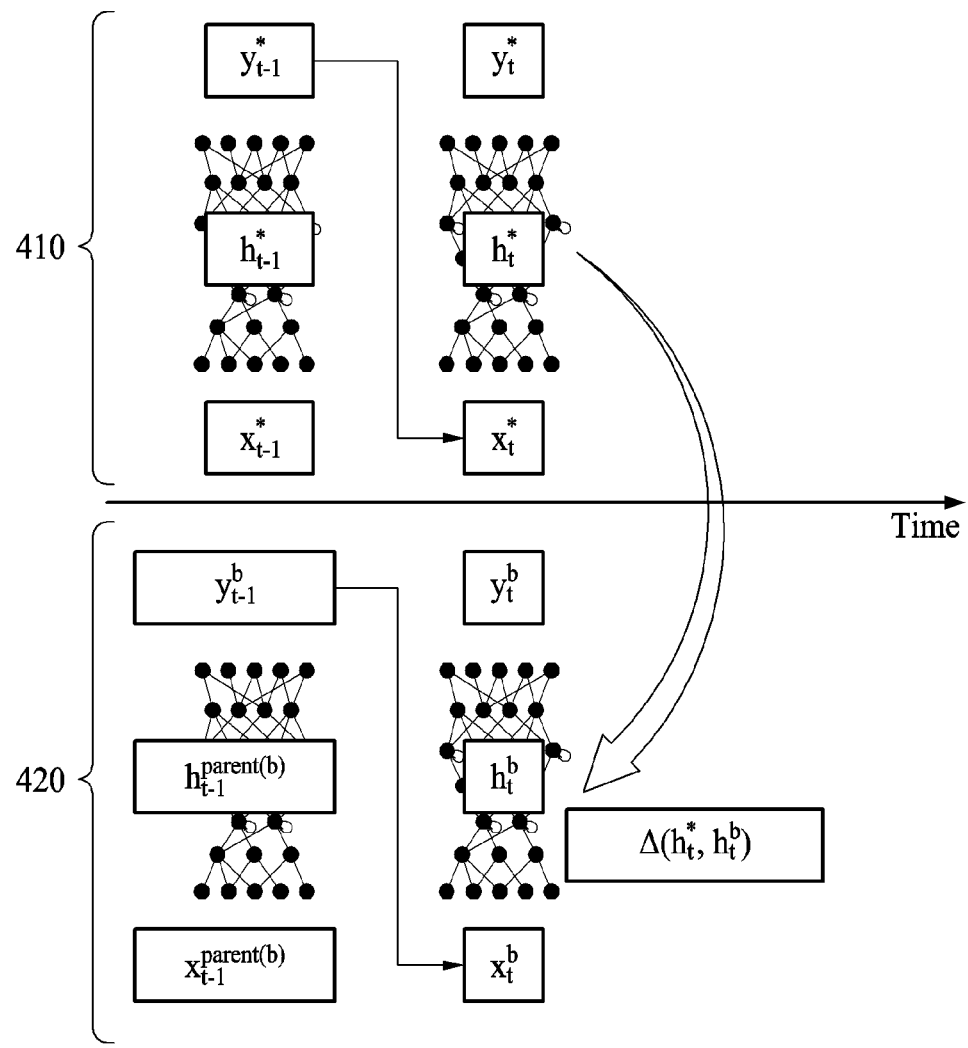
FIGS. 4 through 6 illustrate examples of training a recognition model by a recognition apparatus.
Figure 5:
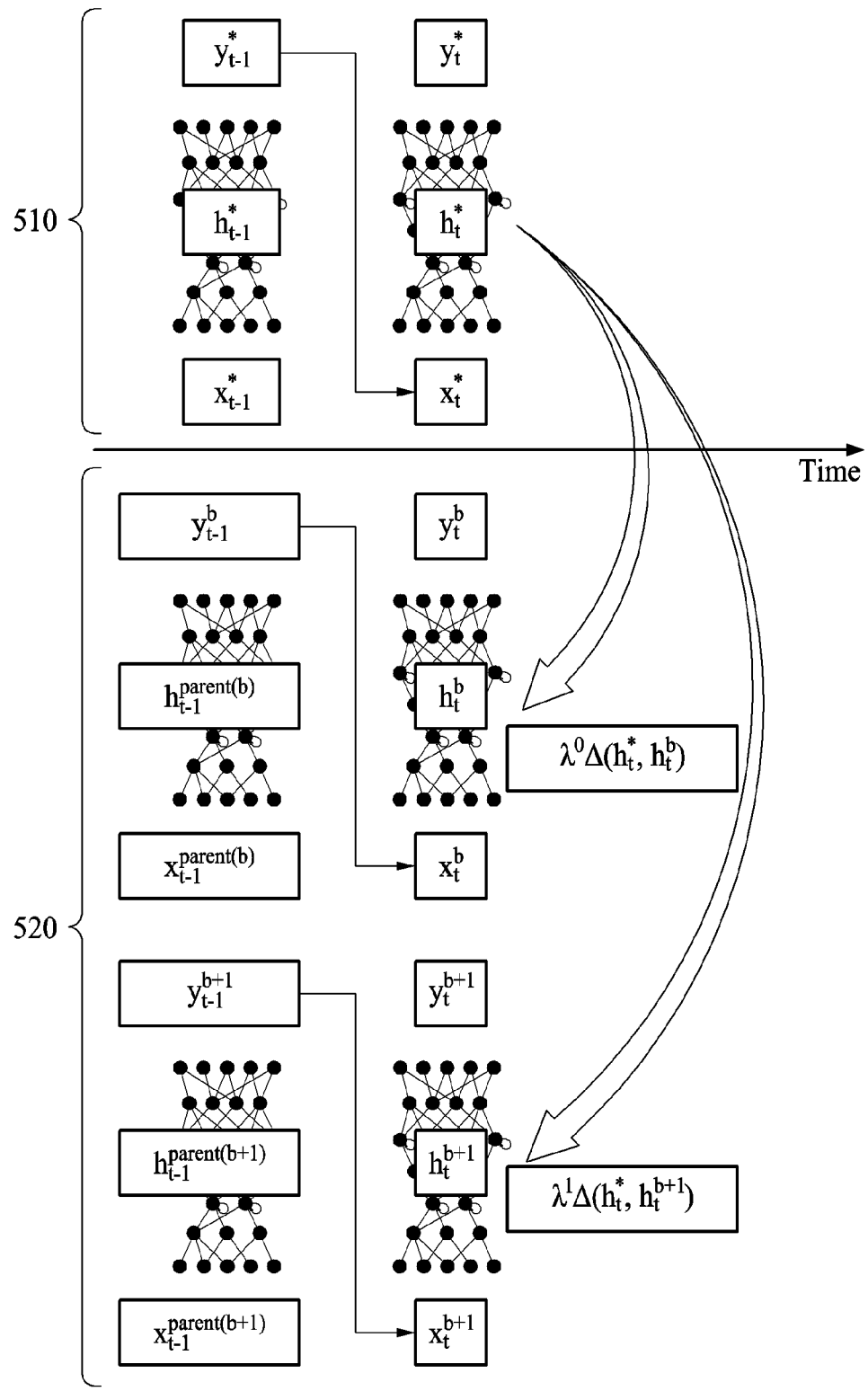
Figure 6:
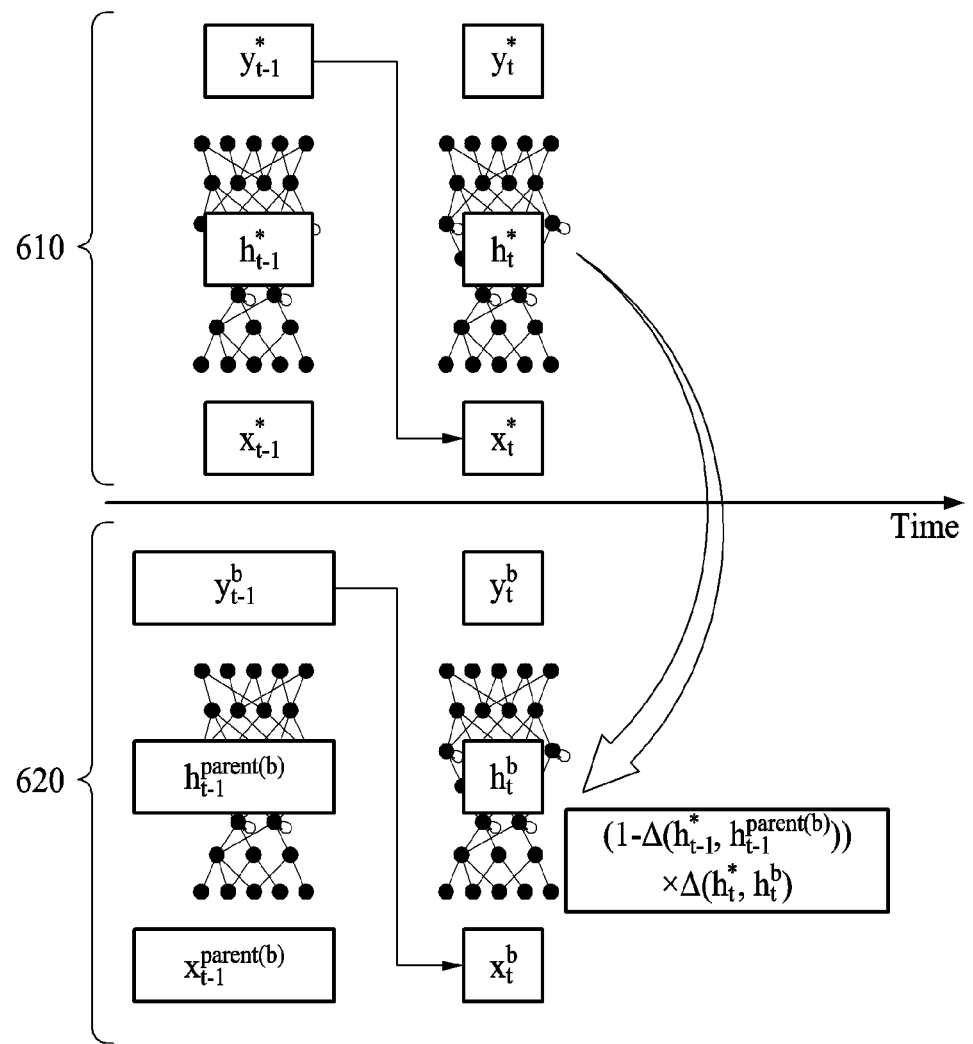

FIGS. 4 through 6 illustrate examples of training a recognition model by a recognition apparatus.

Referring to FIG. 4, a process of training a recognition model based on a loss between an estimation hidden vector $h_t^b$ of a current time t and an answer hidden vector $h^*_t$ is illustrated.

A forced search 410 is a search process of obtaining an answer output vector $y^*_t$, being a predetermined correct output, when an answer input vector $x^*_t$, being a predetermined correct input, is input into the model. In this example, with the model being configured to obtain the correct output vector $y^*_t$, an output of a particular hidden layer of the model may be determined, represented herein as an answer hidden vector $h^*_t$. Here, because the correct output vectors are set for particular input (or sequence of input) vectors prior to training, the search process may be considered forced because the result of the search to be the correct output is being forced.

A beam search (BS) 420 is a search process of obtaining an estimation output vector $y_t^b$, being potentially an incorrect output or unknown as to its complete accuracy, for an estimation input vector $x_t^b$, being potentially an incorrect input or unknown as to its complete accuracy, is input into a model. With this example $x_t^b$ input and $y_t^b$ output, a corresponding hidden layer of the model can be considered as outputting an estimation hidden vector $h_t^b$. Here, the estimation input vector $x_t^b$ may be controlled to correspond to an estimation output vector $y_{t-1}^b$, as an example candidate estimated in the previous time t−1 for an estimation input vector $x_{t-1}^b$ of the previous time t−1. That is, unlike the forced search 410, the BS 420 determines the estimation input vector $x_t^b$ and the estimation output vector $y_t^b$ through actual estimation of the model.

In an example, the forced search 410 and the BS 420 are performed with respect to the same model. FIG. 4 illustrates the forced search 410 and the BS 420 separately for ease of description. However, the models performing the forced search 410 and the BS 420 may be the same model. In addition, the forced search 410 and the BS 420 may be performed simultaneously or in any order.

The model may be an RNN in which an estimation hidden vector $h_{t-1}^{parent(b)}$ output from the hidden layer at the previous time t−1 is also input back into the hidden layer at the current time t. The model may also, or alternatively, be a convolutional neural network (CNN) configured to process sequence data. Also, FIG. 4 illustrates the models being unfolded for ease of description. Accordingly, though illustrated as being unfolded, the model of the current time t and the model of the previous time t−1 are the same model.

For the hidden layer, the recognition apparatus estimates the loss between the estimation hidden vector $h_t^b$ output from the hidden layer at the current time t and the answer hidden vector $h^*_t$, and thus trains the model to reduce the loss, such as in the below mentioned backpropagation learning method, thereby reflecting a level of suitability of a candidate generated in the BS process in training of the model such that the answer output vector $y^*_t$ is output although the estimation input vector $x_t^b$, being a potentially incorrect input or an input unknown as to its complete accuracy, is input into the model.

The example model, e.g., as a neural network configured to implement the recognition model, may be trained through supervised learning and/or un-supervised learning. Supervised learning refers to a method of inputting a known training input into an example neural network, while knowing the expected corresponding training output for that known training input, and repetitively updating or adjusting connection weights of the neural network until the correct training output corresponding to the training input is output, e.g., within a predetermined level or accuracy and/or level of inaccuracy.

As only a non-limiting example, as noted, the training herein may be performed through backpropagation learning, which refers to a method of estimating such aforementioned losses throughout the neural network with respect to provided training data through forward computation or implementation of the in-training neural network input the training data, and then through respective adjustings of the connection weights of the in-training neural network to reduce such losses while propagating estimated losses in a backward direction from the output layer, to a highest hierarchical hidden layer, then to the next lower hierarchical layer, etc., until the connection weights from the input layer are adjusted for reduced loss. Thus, computation or implementation of the neural network with either final trained parameters or the in-training (through repetitive adjustments) training of parameters are thus performed in the forward direction for the desired recognition objective of the neural network in an order of the input layer, a next hierarchical hidden layer, a subsequent hierarchical hidden layer, etc., through to the output layer. However, in the backpropagation learning, the connection weights of respective layers may be updated in the backward direction of an opposite order of the output layer, the highest hierarchical hidden layer, the next lower hierarchical hidden layer, etc., through to the input layer, by iterative adjustments of connection weightings to reduce the aforementioned respective losses. As non-limiting examples, and noting that additional or alternative conditions may be considered to determine when to cease training of the neural network, the training operation may be repeatedly performed for various input and through multiple passes until an overall loss, as only an example, at the output layer and/or the losses of the hidden layers are respectively less than respective predetermined loss thresholds. The finally adjusted connection weights of the neural network may then be stored in a memory of the recognition apparatus, as trained parameters of the neural network. The recognition apparatus, or another recognition apparatus, may thereby implement the trained neural network by reading and implementing the stored parameters for then input information.

Accordingly, further to above, the loss between the estimation hidden vector $h_t^b$ and the answer hidden vector $h^*_t$ may be calculated through a loss function $L_{BS}$, as expressed by Equation 1, for example.

$$L_{BS}=\Sigma_{t,b}\Delta(h^*_t,h_t^b), s.t. h^*_{t-1}=h_{t-1}^{parent(b)} \qquad \text{Equation 1:}$$

In Equation 1, it is assumed that the estimation hidden vector $h_{t-1}^{parent(b)}$ matches an answer hidden vector $h^*_{t-1}$ output from the hidden layer at the previous time t−1.

A difference $\Delta$ between the estimation hidden vector $h_t^b$ and the answer hidden vector $h^*_t$ may be calculated using a Euclidean distance or a cosine similarity, as only examples.

In an example, the model is trained further based on a loss between the estimation output vector $y_t^b$ and the answer output vector $y^*_t$, i.e., in addition to the consideration of the loss between the estimation hidden vector $h_t^b$ and the answer hidden vector $h^*_t$. For example, a combination of the loss function $L_{BS}$ of Equation 1 and a loss function to calculate the loss between the estimation output vector $y_t^b$ and the answer output vector $y^*_t$ may be used to train the model.

Referring to FIG. 5, a process of training the model further based on a candidate ranking is illustrated. FIG. 5 illustrates a forced search 510 and a BS 520 separately merely for ease of description, though the same model may be implemented for both search implementations. In addition, the forced search 510 and each of the searches of the BS 520 may be performed simultaneously, two or more may be performed simultaneous, and/or performed in any order.

The model generates a plurality of candidates by performing inference (i.e., by the model being implemented) based on a BS of performing a search for a predetermined number of determined most suitable candidates, e.g., among candidates estimated at a previous time. The plurality of candidates have determined rankings corresponding to determined levels of suitability thereof.

The recognition apparatus determines a weight based on the candidate rankings, and trains the model by applying the determined weight to the calculated loss between the estimation hidden vector $h_t^b$ of the current time t and the answer hidden vector $h^*_t$. Through this, the model is trained to output a correct answer although a candidate having a relatively low ranking may be input into the model in the BS process.

Each loss function $L'_{BS}$ to which the weight determined based on the candidate ranking is applied is expressed by the below Equation 2, for example.

$$L'_{BS}=\Sigma_{t,b}\lambda^b\Delta(h^*_t,h_t^b), s.t. h^*_{t-1}=h_{t-1}^{parent(b)} \qquad \text{Equation 2:}$$

In Equation 2, $\lambda$ denotes a real number having a value between "0" and "1". b denotes a ranking of a corresponding candidate. For example, in FIG. 5, b denotes a first ranking, and b+1 denotes a second ranking, representing that the first ranking has a higher ranking than the second ranking. Thus, as the candidate ranking is relatively high, a corresponding weight $\lambda^b$ is determined to be relatively great. FIG. 5 illustrates an example of considering the losses, e.g., according to Equation 2, up to the second-ranked candidate for ease of description. However, first through higher-ranked candidates may also be considered without limitation, in various examples. For example, candidates up to a fifth-ranked candidate through a twentieth-ranked candidate may be considered.

For example, the model is trained based on both a first loss between the answer hidden vector $h^*_t$ of the current time t and the estimation hidden vector $h_t^b$ corresponding to the first-ranked candidate and a second loss between the answer hidden vector $h^*_t$ and the estimation hidden vector $h_t^{b+1}$ corresponding to the second-ranked candidate. In this example, a first weight to be applied to the first loss is determined to be greater than a second weight to be applied to the second loss. Thus, the model is trained based on the first loss more than the second loss.

In this example, it is assumed that the estimation hidden vector $h_{t-1}^{parent(b)}$ corresponding to the first-ranked candidate matches the answer hidden vector $h^*_{t-1}$ output from the hidden layer at the previous time t−1. Further, it is also assumed that the estimation hidden vector $h_{t-1}^{parent(b+1)}$ corresponding to the second-ranked candidate matches the answer hidden vector $h^*_{t-1}$ of the previous time t−1.

In an example, the model is trained further based on a loss between the estimation output vector $y_t^b$ and the answer output vector $y^*_t$. For example, a combination of the loss function $L'_{BS}$ to which the weight determined based on the candidate ranking is applied as expressed by Equation 2 and a loss function to calculate the loss between the estimation output vector $y_t^b$ and the answer output vector $y^*_t$ is used to train the model.

Referring to FIG. 6, a process of training the model further based on a loss between the answer hidden vector $h^*_{t-1}$ of the previous time t−1 and the estimation hidden vector $h_{t-1}^{parent(b)}$ is illustrated. Similar to above, FIG. 6 illustrates a forced search 610 and a BS 620 separately merely for ease of description. In addition, the forced search 610 and the BS 620 may be performed simultaneously or in any order.

Although FIGS. 4 and 5 assume that the estimation hidden vector $h_{t-1}^{parent(b)}$ matches the answer hidden vector $h^*_{t-1}$ of the previous time t−1, the estimation hidden vector $h_{t-1}^{parent(b)}$ may not match the answer hidden vector $h^*_{t-1}$ of the previous time t−1 in actual implementation. In this example, the model is trained further based on the loss between the answer hidden vector $h^*_{t-1}$ of the previous time t−1 and the estimation hidden vector $h_{t-1}^{parent(b)}$.

Thus, a loss function $L''_{BS}$ further considering the loss between the answer hidden vector $h^*_{t-1}$ of the previous time t−1 and the estimation hidden vector $h_{t-1}^{parent(b)}$ is expressed by the below Equation 3, for example.

$$L''_{BS}=\Sigma_{t,b}[1-\Delta(h^*_{t-1},h_{t-1}^{parent(b)})]\Delta(h^*_t,h_t^b) \qquad \text{Equation 3:}$$

As expressed by Equation 3, the loss is calculated by applying a difference between the answer hidden vector $h^*_{t-1}$ and the estimation hidden vector $h_{t-1}^{parent(b)}$ output from the hidden layer at the previous time t−1 as a weight.

As the difference between the answer hidden vector $h^*_{t-1}$ and the estimation hidden vector $h_{t-1}^{parent(b)}$ of the previous time t−1 becomes relatively great, the weight is determined to be become relatively small. For example, when the difference between the answer hidden vector $h^*_{t-1}$ and the estimation hidden vector $h_{t-1}^{parent(b)}$ of the previous time t−1 is relatively great, $\Delta(h^*_{t-1}, h_{t-1}^{parent(b)})$ is determined close to "1", and thus the weight $[1-\Delta(h^*_{t-1}, h_{t-1}^{parent(b)})]$ is determined close to "0". Conversely, when the difference between the answer hidden vector $h^*_{t-1}$ and the estimation hidden vector $h_{t-1}^{parent(b)}$ of the previous time t−1 is relatively small, $\Delta(h^*_{t-1}, h_{t-1}^{parent(b)})$ is determined close to "0", and thus the weight $[1-\Delta(h^*_{t-1}, h_{t-1}^{parent(b)})]$ is determined close to "1".

In an example, the model is trained further based on a loss between the estimation output vector $y_t^b$ and the answer output vector $y^*_t$. For example, a combination of the loss function $L"_{BS}$ of Equation 3 and a loss function to calculate the loss between the estimation output vector $y_t^b$ and the answer output vector $y^*_t$ may be used to train the model.

Figure 7:
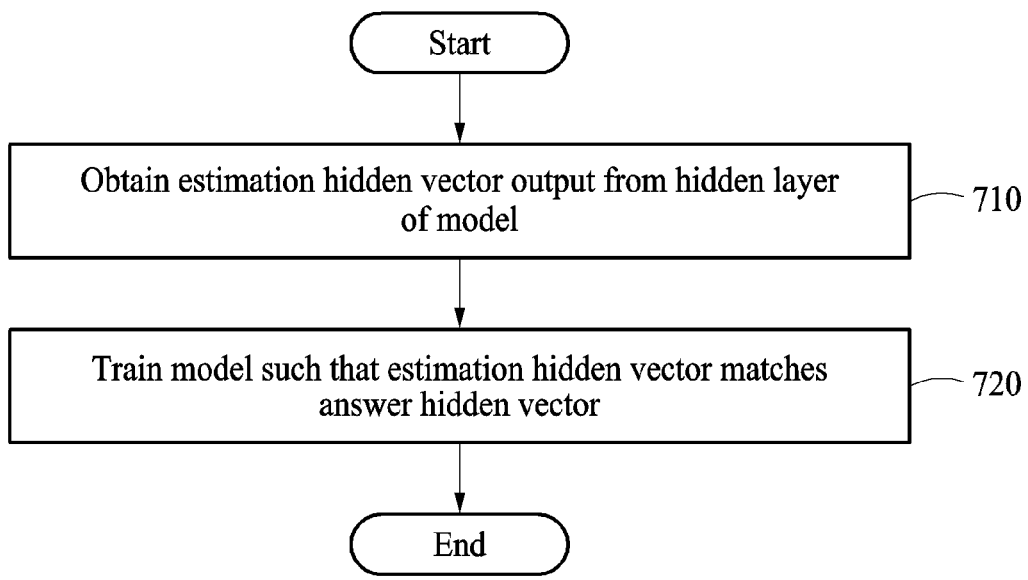
FIG. 7 illustrates an example of a training method of a recognition apparatus.

FIG. 7 illustrates an example of a training method of a recognition apparatus.

Referring to FIG. 7, a training method performed by a processor of a recognition apparatus is illustrated.

In operation 710, the recognition apparatus obtains an estimation hidden vector $h_t^b$ output from a hidden layer of a model in response to an estimation output vector $y_{t-1}^b$ output from the model at a previous time t−1 being input into the model at a current time t.

In operation 720, the recognition apparatus trains the model such that the estimation hidden vector $h_t^b$ matches an answer hidden vector $h^*_t$ output from the hidden layer in response to an answer output vector $y^*_{t-1}$ corresponding to the estimation output vector $y_{t-1}^b$ of the previous time t−1 being input into the model at the current time t. For example, an estimation hidden vector $h_{t-1}^{parent(b)}$ output from the hidden layer of the model at the previous time t−1 matches an answer hidden vector $h^*_{t-1}$ corresponding to the estimation hidden vector $h_{t-1}^{parent(b)}$ of the previous time t−1.

The recognition apparatus determines a first weight based on a difference between the estimation hidden vector $h_{t-1}^{parent(b)}$ output from the hidden layer of the model at the previous time t−1 and the answer hidden vector $h^*_{t-1}$ corresponding to the estimation hidden vector $h_{t-1}^{parent(b)}$ of the previous time t−1. The recognition apparatus trains the model by applying the determined first weight to a difference between the answer hidden vector $h^*_t$ of the current time t and the estimation hidden vector $h_t^b$. For example, the first weight is determined to become relatively small as a difference between the estimation hidden vector $h_{t-1}^{parent(b)}$ of the previous time t−1 and the answer hidden vector $h^*_{t-1}$ of the previous time t−1 becomes relatively great.

The recognition apparatus trains the model such that the estimation hidden vector $h_t^b$ matches the answer hidden vector $h^*_t$ of the current time t, and an estimation output vector $y_t^b$ output from the model at the current time t matches an answer output vector $y^*_t$ corresponding to the estimation output vector $y_t^b$ of the current time t.

The recognition apparatus trains the model by applying a second weight to a difference between the estimation hidden vector $h_t^b$ of the current time t and the answer hidden vector $h^*_t$ of the current time t, e.g., with the second weight being determined based on a candidate ranking of the estimation output vector $y_{t-1}^b$ of the previous time t−1. For example, the second weight may be determined to become relatively great as the candidate ranking of the estimation output vector $y_{t-1}^b$ of the previous time t−1 becomes relatively high.

The description provided with reference to FIGS. 1 through 6 is applicable to operations of FIG. 7, and thus duplicated description will be omitted herein for conciseness.

Figure 8:
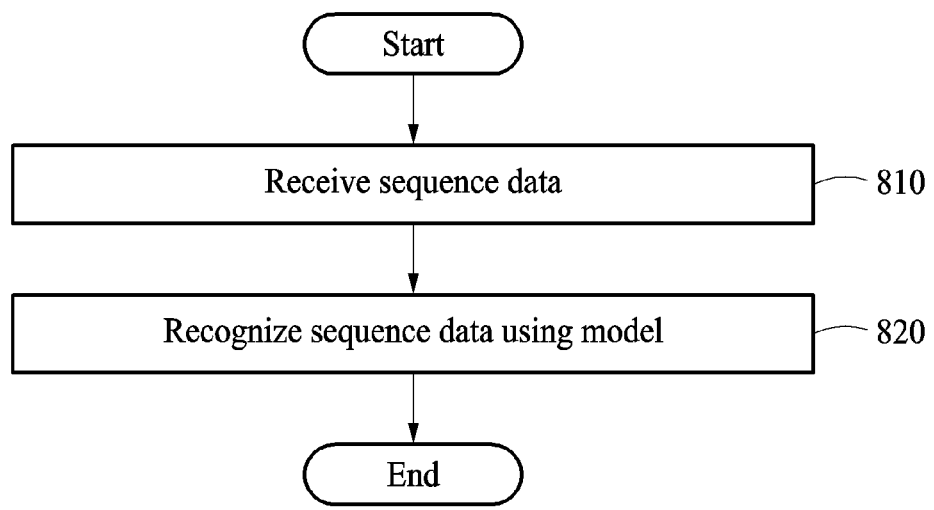
FIG. 8 illustrates an example of a recognition method of a recognition apparatus.

FIG. 8 illustrates an example of a recognition method of a recognition apparatus.

Referring to FIG. 8, a recognition method performed by a processor of the recognition apparatus is illustrated.

In operation 810, the recognition apparatus receives sequence data. For example, the sequence data may be data having a temporality or a sequence, such as, for example, speech data, image data, biometric data, or handwriting data. The recognition apparatus may correspond to any of the aforementioned recognition apparatuses that are configured to train and/or implement recognition (interpretation) of such sequence data. The recognition apparatus may also correspond to any of the recognition apparatuses of FIGS. 1A and 1C, and any of the electronic devices 900 of the below illustrated FIGS. 9A and 9B.

In operation 820, the recognition apparatus recognizes (interprets) the sequence data using a pre-trained model, e.g., trained as discussed above with respect to FIGS. 1A-7. For example, with the example of FIG. 1A, the recognition apparatus recognizes a sentence or a word corresponding to the sequence data, while with the example of FIG. 10, the recognition apparatus recognizes a sentence or a word corresponding to the sequence data and translates or interprets the sequence data of a first language into a second language. In another example, any of the recognition apparatuses described herein may identify a person in a video, or in another example recognize a physical condition of a user by analyzing biometric signals such as electrocardiogram (ECG) or electroencephalogram (EEG), or recognize an input handwriting by analyzing a motion of the user, noting that additional examples are also available.

For example, the model may be trained such that an estimation hidden vector $h_t^b$ output from a hidden layer of the model, in response to an estimation output vector $y_{t-1}^b$ output from the model at a previous time t−1 being input into the model at a current time t, matches an answer hidden vector $h^*_t$ corresponding to the estimation output vector $h_t^b$.

The descriptions provided above with respect to FIGS. 1A-7 are applicable to the training of the model of FIG. 8, and thus duplicated description will be omitted herein for conciseness.

Figure 9A:
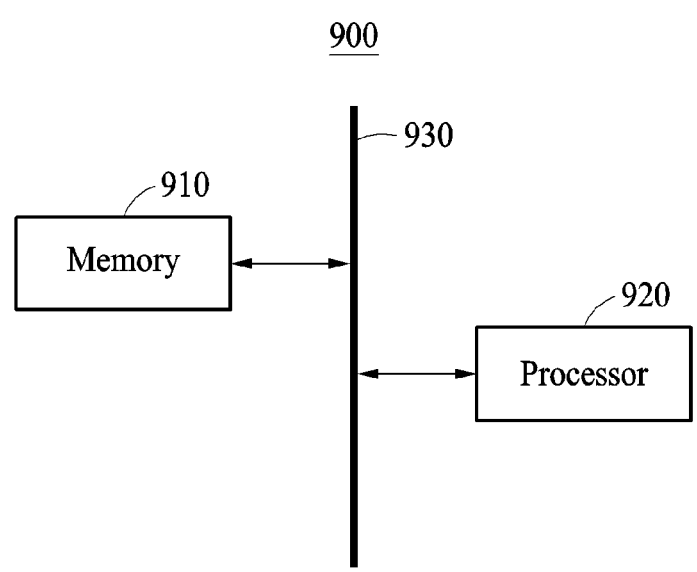
FIGS. 9A and 9B illustrate examples of an electronic device.
Figure 9B:
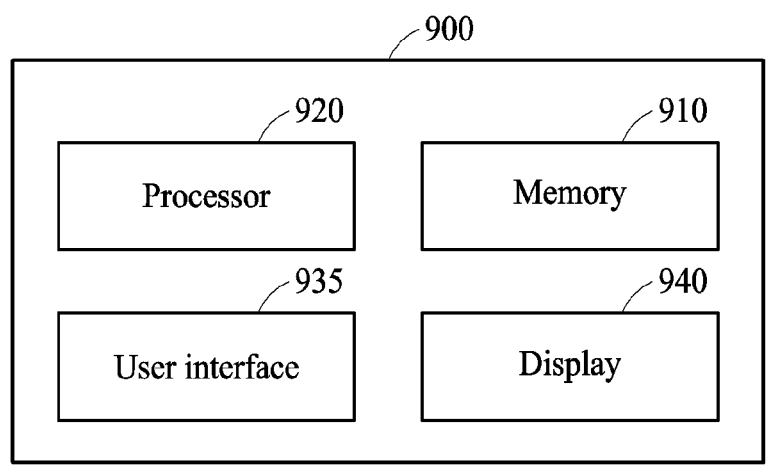

FIGS. 9A and 9B illustrate examples of an electronic device.

Referring to FIGS. 9A and 9B, respective electronic devices 900 includes a memory 910 and a processor 920. The memory 910 and the processor 920 communicate with each other through a bus 930. The training and the recognition of example recognition apparatuses described above may each be implemented as at least a part of the electronic devices 900.

The memory 910 is configured to store parameters of the model described above. Further, the memory 910 includes computer-readable instructions. The processor 920 performs the operations mentioned above in response to the instructions stored in the memory 910 being executed by the processor 920. The memory 910 is a volatile memory or a non-volatile memory.

The processor 920 includes, represents, or included in any one, any combination, or all of the apparatuses described with reference to FIGS. 1A through 8, or performs any one, any combination, or all of the methods or processes described with reference to FIGS. 1A through 8.

For example, during training for the recognition model, the processor 920 may obtain an estimation hidden vector output from a hidden layer of the model in response to an estimation output vector output from the model at a previous time being input into the model at a current time, and train the model such that the estimation hidden vector of the current time matches an answer hidden vector output from the hidden layer in response to an answer output vector corresponding to the estimation output vector of the previous time being input into the model at the current time. During or when all layers of the recognition model are trained, the corresponding trained connections weights or trained parameters may be stored in the memory 910.

Further, during implementation of the recognition model, the processor 920 may receive sequence data, and perform recognition (interpretation) of the sequence data using the model. Here, the model is trained such that an estimation hidden vector output from a hidden layer of the model in response to an estimation output vector output from the model at a previous time being input into the model at a current time matches an answer hidden vector corresponding to the estimation output vector of the previous time. As only an example, the recognition model may be implemented by the processor 920 loading or acquiring the trained connection weights or parameters, such as from memory 910, and applying the trained connection weights or parameters to the sequence data. Accordingly, the processor 920 may thereby be configured to include the corresponding neural network configured to implement the recognition model.

In addition, the processor 920, or another processor, may control sampling of sound, sampling of the captured sound, and provision of resulting sampled audio frames to the an example input layer of the neural network, such as discussed above with respect to FIGS. 1A through 8, as only examples. As an alternative, the processor 920 may control sampling of image information, and the provision of the same to the example input layer, or control sampling or acquiring of alternative information as discussed above for interpretation by the recognition model. The processor 920 may further be configured to load trained parameters of the example neural networks for configuring the processor 920 as any or any combination of the neural network examples of FIGS. 1A through 8, as non-limiting examples. Still further, the processor 920 may be configured to routinely request and receive updates to such stored trained parameters.

Further referring to FIG. 9B, the user interface 935 may be representative of hardware wired and/or wireless communication modules, as well as other user interface devices, such as a microphone, camera, keyboard, touch screen, mouse, and/or stylus, as only examples. In an external or remote example, the processor 920 may perform the sampling of a voices of users, such as of an analog signal captured by the microphone represented by the user interface 935, or capturing of image or video information by a camera represented by the user interface 935, and then using the hardware communication module(s) may communicate the same to one or more external servers, as only an example, which may implement any of the operations described herein with respect to FIGS. 1A through 8, or another processor of the recognition apparatus 900 may be configured to implement the training and/or recognition operations described herein. As a result of the recognition through the implementation of any example recognition models, the result of the recognition may be output through the user interface 935, displayed through the display 940, or used by the processor 920 to initiate further operations of the recognition apparatus 900, such as where the recognition apparatus 900 is a mobile device or personal assistant device and the processor 920 controls further operations mobile device, such as unlocking the recognition apparatus 900 upon speech or image verification, initiating a phone call or playing select music commanded by recognized speech, etc., as only examples.

In addition, the descriptions provided above with respect to FIGS. 1A-8 are applicable to the electronic devices 900 of FIGS. 9A and 9B, and thus duplicated descriptions thereof will be omitted herein or conciseness.

The recognition apparatuses herein, including the recognition apparatuses 110, 100, and 900, which are configured to perform training and/or interpretation operations respectively described herein with respect to FIGS. 1A-9B, the memory 910, the processor 920, the user interface 935, and display 940 and other apparatuses, modules, devices, and other components described herein with respect to FIGS. 1A-9B and that perform operations described in this application are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The processes and methods illustrated in FIGS. 1A-9B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or one or more computers so that the one or more processors or one or more computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented model training method, the method comprising:

obtaining a hidden vector for a current time as output from a hidden layer of a recognition model, in response to an output vector output from an output layer of the recognition model at a previous time being input into an input layer of the recognition model at a current time; and training the recognition model such that the hidden vector for the current time matches a reference hidden vector for the current time as output from the hidden layer in response to a reference output vector being input into the input layer of the recognition model for the current time, the reference output vector being training data output from the output layer at the previous time.

2. The method of claim 1, wherein the training comprises determining a first weight based on a determined difference between a hidden vector for the previous time as output from the hidden layer of the recognition model and a reference hidden vector for the previous time corresponding to the hidden vector for the previous time, and applying the determined first weight to a determined difference between the reference hidden vector for the current time and the hidden vector for the current time to generate a loss for the hidden layer that parameters of the recognition model are adjusted toward in the training for reducing the loss.

3. The method of claim 2, wherein the first weight is determined to decrease as the difference increases, and the first weight is determined to increase as the difference decreases.

4. The method of claim 1, wherein a hidden vector for the previous time as output from the hidden layer of the recognition model for the previous time matches a reference hidden vector for the previous time corresponding to the hidden vector for the previous time.

5. The method of claim 1, wherein the training comprises training the recognition model such that the hidden vector for the current time matches the reference hidden vector for the current time, and such that an output vector output from the recognition model at the current time matches a reference output vector corresponding to the output vector of the current time.

6. The method of claim 1, wherein the recognition model is a recurrent neural network (RNN) in which a hidden vector for the previous time, output from the hidden layer for the previous time, is input to the hidden layer for the current time.

7. The method of claim 1, wherein the recognition model is configured to perform an inference operation based on a beam search (BS) to perform a search for a predetermined number of most suitable candidates among candidates estimated at the previous time.

8. The method of claim 7, wherein the training comprises training the recognition model by applying a second weight to a determined difference between the hidden vector for the current time and the reference hidden vector for the current time to generate a loss for the hidden layer that parameters of the recognition model are adjusted toward in the training for reducing the loss,
wherein the second weight is determined based on a candidate ranking of the output vector at the previous time.

9. The method of claim 8, wherein the second weight is determined to increase as the candidate ranking of the output vector at the previous time increases and the second weight is determined to decrease as the candidate ranking of the output vector at the previous time decreases.

10. A non-transitory computer-readable storage medium storing instructions that, when executed by a processor, cause the processor to perform the method of claim 1.

11. A processor implemented recognition method, comprising:
acquiring sequence data; and
recognizing the sequence data by implementing a pre-trained recognition model that is trained such that a hidden vector for a current time as output from a hidden layer of the recognition model matches a reference hidden vector, in response to the output vector output from the output layer of the recognition model at the previous time being input into an input layer of the recognition model at the current time,
wherein the reference hidden vector for the current time is output from the hidden layer in response to a reference output vector being input into the input layer of the recognition model for the current time, the reference output vector being training data output from the output layer at the previous time.

12. A model training apparatus, the apparatus comprising:
a processor configured to:
obtain a hidden vector for a current time as output from a hidden layer of a recognition model, in response to an output vector output from an output layer of the recognition model at a previous time being input into an input layer of the recognition model at a current time; and
train the recognition model such that the hidden vector for the current time matches a hidden vector for the current time as output from the hidden layer in response to a reference output vector being input into the input layer of the recognition model for the current time, the reference output vector being training data output from the output layer at the previous time.

13. The apparatus of claim 12, further comprising a memory storing instructions, which when executed by the processor, cause the processor to perform the obtaining of the hidden vector for the current time, perform the training of the recognition model such that the hidden vector for the current time matches the hidden vector for the current time, and perform the storing of the trained recognition model in the memory.

14. The apparatus of claim 12, wherein the processor is configured to
determine a first weight based on a determined difference between a hidden vector for the previous time as output from the hidden layer of the model for the previous time and a reference hidden vector for the previous time corresponding to the hidden vector for the previous time, and
apply the determined first weight to a determined difference between the reference hidden vector for the current time and the hidden vector for the current time to generate a loss for the hidden layer that parameters of the recognition model are adjusted toward in the training for reducing the loss.

15. The apparatus of claim 12, wherein a hidden vector for the previous time as output from the hidden layer of the recognition model for the previous time matches a reference hidden vector for the previous time corresponding to the hidden vector for the previous time.

16. The apparatus of claim 12, wherein the processor is configured to train the recognition model such that the hidden vector for the current time matches the reference hidden vector for the current time, and such that an output vector output from the recognition model at the current time matches a reference output vector corresponding to the output vector of the current time.

17. The apparatus of claim 12, wherein the recognition model is configured to perform an inference operation based on a beam search (BS) to perform a search for a predetermined number of most suitable candidates among candidates estimated at the previous time.

18. The apparatus of claim 17, wherein the processor is configured to train the recognition model by applying a second weight to a determined difference between the hidden vector for the current time and the reference hidden vector for the current time to generate a loss for the hidden layer that parameters of the recognition model are adjusted toward in the training for reducing the loss,
wherein the second weight is determined based on a candidate ranking of the output vector at the previous time.

19. The method of claim 1, wherein
the reference output vector is a predetermined correct output from the output layer of the recognition model in response to a reference input vector is input into the input layer of the recognition model, and
the reference hidden vector is a vector output from the hidden layer of the recognition model in response to the reference input vector being input into the input layer.

20. The method of claim 1, wherein
the output vector at the previous time is an output from the output layer of the recognition model in response to an input vector at the previous time, corresponding to an input data to be recognized using the recognition model, is input to the input layer of the recognition model, and
the hidden vector at the current time is a vector output from the hidden layer of the model in response to an input vector for the current time being input into the input layer at the current time.

* * * * *